(12) United States Patent
Futae et al.

(10) Patent No.: US 10,060,470 B2
(45) Date of Patent: Aug. 28, 2018

(54) THRUST BEARING AND ROTARY MACHINE

(71) Applicant: MITSUBISHI HEAVY INDUSTRIES ENGINE & TURBOCHARGER, LTD., Sagamihara-shi, Kanagawa (JP)

(72) Inventors: Takaya Futae, Tokyo (JP); Yosuke Danmoto, Tokyo (JP); Mitsushige Kubota, Tokyo (JP); Hiroshi Suzuki, Tokyo (JP); Tatsuya Ishizaki, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 15/325,363

(22) PCT Filed: Oct. 21, 2014

(86) PCT No.: PCT/JP2014/077915
§ 371 (c)(1),
(2) Date: Jan. 10, 2017

(87) PCT Pub. No.: WO2016/063340
PCT Pub. Date: Apr. 28, 2016

(65) Prior Publication Data
US 2017/0159702 A1    Jun. 8, 2017

(51) Int. Cl.
*F16C 17/04* (2006.01)
*F01D 25/16* (2006.01)
(Continued)

(52) U.S. Cl.
CPC ............ *F16C 17/04* (2013.01); *F01D 25/168* (2013.01); *F16C 17/047* (2013.01); *F16C 33/02* (2013.01);
(Continued)

(58) Field of Classification Search
CPC .... F16C 17/04; F16C 17/047; F16C 33/1075; F16C 2360/24
See application file for complete search history.

(56) References Cited

U.S. PATENT DOCUMENTS 3,495,866 A * 2/1970 Bontrager ............... B60P 3/341
296/173
4,348,065 A * 9/1982 Yoshioka ............ F16C 33/1075
384/121
(Continued)

FOREIGN PATENT DOCUMENTS

CN     103492733 A    1/2014
CN     103842667 A    6/2014
(Continued)

OTHER PUBLICATIONS

International Preliminary Report on Patentability dated May 4, 2017, for International PCT Application No. PCT/JP2014/077915 with English Translation.
(Continued)

*Primary Examiner* — Phillip A Johnson
(74) *Attorney, Agent, or Firm* — Birch, Stewart, Kolasch & Birch, LLP

(57) ABSTRACT

To reduce bearing loss due to an oil-shortage region on a pad facing a thrust collar, a thrust bearing according to at least one embodiment of the present invention includes a thrust collar, and at least one bearing pad disposed along a circumferential direction on a bearing surface, the at least one bearing pad having a tapered portion and a land portion. Each of the at least one bearing pad is formed so that a periphery portion on an outer side with respect to a radial direction gets closer to an inner side with respect to the radial direction toward an upstream side with respect to the rotational direction.

9 Claims, 7 Drawing Sheets

(51) Int. Cl.
  *F16C 33/02* (2006.01)
  *H02K 5/167* (2006.01)
  *F16C 33/10* (2006.01)

(52) U.S. Cl.
  CPC ......... *F16C 33/1075* (2013.01); *H02K 5/167* (2013.01); *F05D 2220/40* (2013.01); *F16C 2360/24* (2013.01)

(56) References Cited

U.S. PATENT DOCUMENTS

| | | | | |
|---|---|---|---|---|
| 4,383,771 | A | * | 5/1983 | Freytag ................. F16C 33/106 384/121 |
| 5,810,479 | A | * | 9/1998 | Miyasaka ............. F16C 17/026 384/107 |
| 5,951,169 | A | * | 9/1999 | Oklejas ............... F16C 33/1065 384/123 |
| 5,973,878 | A | * | 10/1999 | Yoshida ................ F16C 17/026 360/98.07 |
| 5,980,114 | A | * | 11/1999 | Oklejas, Jr. ........... F04D 29/047 384/123 |
| 9,169,865 | B2 | | 10/2015 | Hayashi et al. |
| 9,470,240 | B2 | | 10/2016 | Uneura |
| 9,719,557 | B2 | * | 8/2017 | Gauger ................. F16C 17/047 |
| 2014/0044540 | A1 | | 2/2014 | Uneura |
| 2014/0233873 | A1 | | 8/2014 | Hayashi et al. |

FOREIGN PATENT DOCUMENTS

| | | | | |
|---|---|---|---|---|
| DE | 2408938 A1 | * | 10/1974 | .......... F16C 33/1075 |
| EP | 0 658 895 A2 | | 6/1995 | |
| EP | 0896163 A1 | | 2/1999 | |
| EP | 2 703 664 A1 | | 3/2014 | |
| JP | 52-67442 | | 6/1977 | |
| JP | 57-163723 A | | 10/1982 | |
| JP | 58-17214 A | | 2/1983 | |
| JP | 11-2246 A | | 1/1999 | |
| JP | 11-51043 A | | 2/1999 | |
| JP | 2003-222123 A | | 8/2003 | |
| JP | 2006-77803 A | | 3/2006 | |
| JP | 4296292 B2 | * | 7/2009 | ............ F16C 17/047 |
| WO | WO 2012/147542 A1 | | 11/2012 | |

OTHER PUBLICATIONS

Office Action dated Aug. 4, 2017 issued to the corresponding JP Application No. 2016-554970 with an English machine Translation.
Extended European Search Report dated Jul. 3, 2017 issued to the corresponding EP Application No. 14904352.3.
International Search Report issued in PCT/JP2014/077915 (PCT/ISA/210), dated Jan. 27, 2015.
Japanese Office Action, dated Mar. 16, 2018, for Japanese Application No. 2016-554970, as well as an English machine translation.
Chinese Office Action and Search Report for Chinese Application No. 201480080540.3, dated Mar. 28, 2018.

* cited by examiner

THRUST BEARING AND ROTARY MACHINE

TECHNICAL FIELD

The present disclosure relates to a tapered-land type thrust bearing and a rotary machine including the thrust bearing.

BACKGROUND ART

A tapered-land type thrust bearing is known as a thrust bearing which receives loads (thrust loads) applied to a rotational shaft of a rotary machine along an axial direction. A tapered-land type thrust bearing includes a pad having a land portion and a tapered portion on a bearing surface facing a thrust collar. In a tapered-land type thrust bearing, lubricant oil is drawn into clearance between a thrust collar and a bearing surface in response to relative rotation between the thrust collar and the bearing surface. A tapered portion is formed so that the clearance gradually reduces downstream in the rotational direction, and thereby the lubricant oil drawn into the clearance is guided toward a land portion while being pressurized, whereby a reaction force against a thrust load is generated. Accordingly, the thrust bearing supports thrust loads.

Patent Document 1 discloses, for instance, a technique related to such a kind of tapered-land type thrust bearing. Patent Document 1 discloses a thrust bearing provided with a plurality of pads having a land portion and a tapered portion arranged along a circumferential direction. The document particularly describes a technique to prevent deformation of the pads due to thermal expansion, by providing a heat-insulating layer on the surfaces of the pads.

Citation List

Patent Literature

Patent Document 1: JP2006-77803A

SUMMARY

Problems to be Solved

In Patent Document 1, a plurality of pads having a tapered portion and a land portion are arranged in a circumferential direction, and a boundary line between a tapered portion and a land portion of adjacent pads is formed along a radial direction. A tapered-land type thrust bearing with such a configuration was evaluated for its lubrication performance on a bearing surface facing a thrust collar. As a result of the evaluation, it was found that there is a region where lubricant oil is insufficient in the clearance. Such a region with shortage of lubricant oil may cause bearing loss.

In view of the above issue, an object of at least one embodiment of the present invention is to provide a thrust bearing and a rotary machine provided with the thrust bearing, whereby it is possible to reduce bearing loss due to a region of insufficient lubrication on a pad facing a thrust collar.

Solution to the Problems (1) A thrust bearing according to at least one embodiment of the present invention comprises: a thrust collar fixed to a rotational shaft; and at least one bearing pad disposed along a circumferential direction on a bearing surface facing the thrust collar, the at least one bearing pad having a tapered portion formed so that clearance between the at least one bearing pad and the thrust collar decreases toward a downstream side with respect to a rotational direction, and a land portion formed continuously from the tapered portion toward the downstream side with respect to the rotational direction so that the clearance is constant. Each of the at least one bearing pad is formed so that a periphery portion on an outer side with respect to a radial direction gets closer to an inner side with respect to the radial direction toward an upstream side with respect to the rotational direction.

With the above configuration (1), in a tapered-land type thrust bearing, the bearing pad is formed so that the periphery portion on the outer side with respect to the radial direction gets closer to the inner side with respect to the radial direction toward the upstream side with respect to the rotational direction. Accordingly, it is possible to reduce an oil-shortage region formed on the outer side with respect to the radial direction on the upstream side with respect to the rotational direction. As a result, the bearing loss is reduced, and it is possible to provide a thrust-tapered type thrust bearing having a high efficiency.

(2) In some embodiments, in the above configuration (1), the at least one bearing pad comprises a first bearing pad, and a second bearing pad disposed adjacently to the first bearing pad on a downstream side of the first bearing pad with respect to the rotational direction. A boundary line between the land portion of the first bearing pad and the tapered portion of the second bearing pad is formed so as to incline from the radial direction toward the downstream side with respect to the rotational direction.

With the above configuration (2), a boundary line between the land portion and the tapered portion of two adjacent bearing pads is formed so as to incline from the radial direction toward the downstream side with respect to the rotational direction. Accordingly, it is possible to reduce the oil-shortage region formed on the outer side with respect to the radial direction on the upstream side with respect to the rotational direction as compared to a case where the boundary line is parallel to the radial direction, and thereby the bearing loss is reduced.

(3) In some embodiments, in the above configuration (2), the boundary line has a curved shape so that an inclination angle formed with the radial direction increases toward the downstream side with respect to the rotational direction.

With the above configuration (3), the boundary line is formed into a curved shape so that an inclination angle formed with the radial direction increases toward the downstream side with respect to the rotational direction. As a result of intensive researches, the present inventors found that streamlines of oil on the bearing pad also form curves. Accordingly, with the boundary line being formed into a curved shape so as to correspond to streamlines, it is possible to reduce the oil-shortage region even more effectively, and to reduce the bearing loss.

(4) In some embodiments, in the above configuration (2), the boundary line has a linear shape.

With the above configuration (4), the boundary line is formed into a linear shape, and thereby it is possible to reduce the bearing loss with a simple configuration. Accordingly, processing is simplified, which is advantageous in terms of costs.

(5) In some embodiments, in any one of the above configurations (2) to (4), the tapered portion is formed so that the clearance decreases toward the outer side with respect to the radial direction.

With the above configuration (5), the tapered portion is formed so that the clearance decreases toward the outer side with respect to the radial direction. Accordingly, it is possible to retard drainage of oil, taken into the thrust bearing during rotation, to the outer side with respect to the radial direction due to a centrifugal force. As a result, the lubrication state on the bearing surface improves, which makes it possible to reduce the bearing loss even more.

(6) In some embodiments, in the above configuration (5), the tapered portion is formed so that the clearance on an outermost side with respect to the radial direction is equal to the clearance at the land portion.

With the above configuration (6), the tapered portion has clearance on an outer side with respect to the radial direction which is equal to the clearance at the land portion. Accordingly, it is possible to retard drainage of oil to the outer side with respect to the radial direction due to a centrifugal force even more effectively. As a result, the lubrication state on the pad improves, which makes it possible to reduce the bearing loss even more.

(7) In some embodiments, the at least one bearing pad is formed so that a length of the at least one bearing pad in the radial direction decreases toward the upstream side with respect to the rotational direction.

With the above configuration (7), the thrust bearing is formed so that the length of the bearing pad in the radial direction decreases toward the upstream side with respect to the rotational direction. Accordingly, it is possible to reduce the oil-shortage region formed on the outer side with respect to the radial direction on the upstream side with respect to the rotational direction as compared to a case where the length of the bearing pad is constant in the radial direction, and thereby the bearing loss is reduced.

(8) A rotary machine according to at least one embodiment of the present invention includes the thrust bearing according to any one of the above (1) to (7), which makes it possible to reduce bearing loss and to achieve high efficiency.

Advantageous Effects

According to at least one embodiment of the present invention, it is possible to provide a thrust bearing and a rotary machine provided with the thrust bearing, whereby it is possible to reduce bearing loss that is caused by a region where lubrication is insufficient on a pad facing the thrust collar.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Related Art

Figure 7:
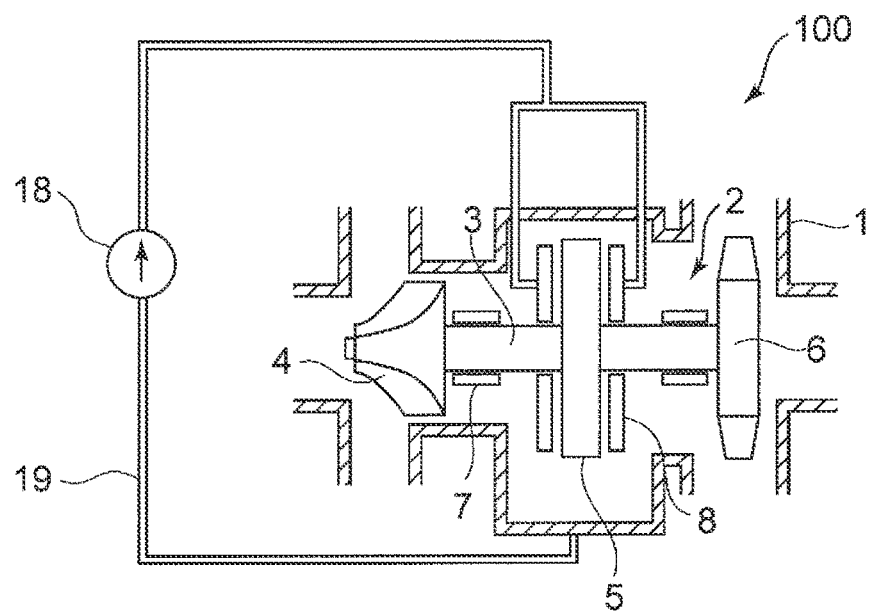
FIG. 7 is a cross-sectional view of a schematic configuration of a rotary apparatus provided with a thrust bearing according to a related art.
Figure 8:
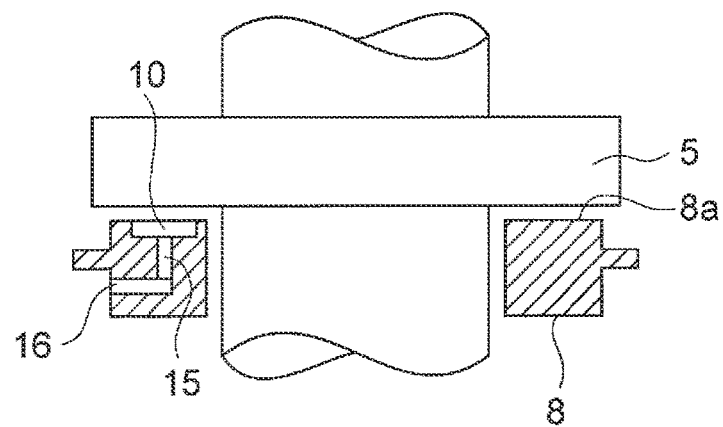
FIG. 8 is a cross-sectional view of a part of FIG. 7.
Figure 9:
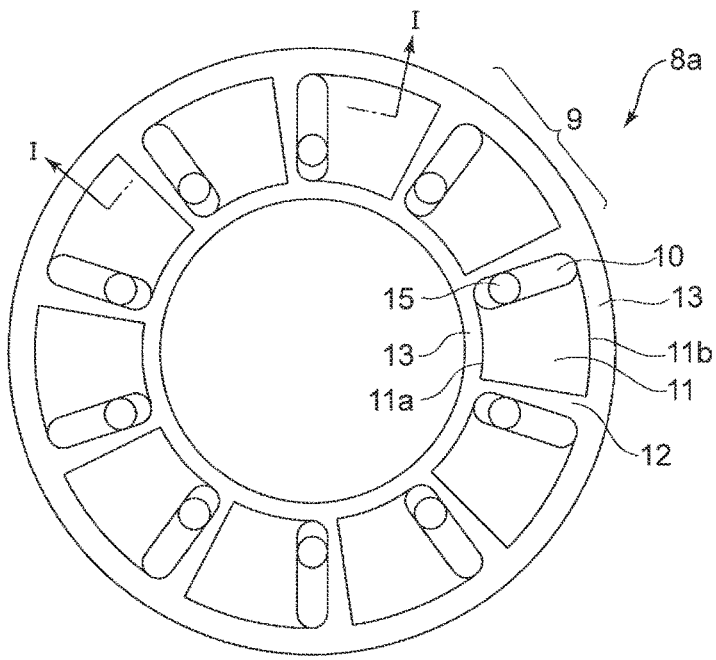
FIG. 9 is a planar view of a bearing surface of the thrust bearing in FIG. 7 as seen in an axial direction.
Figure 10:
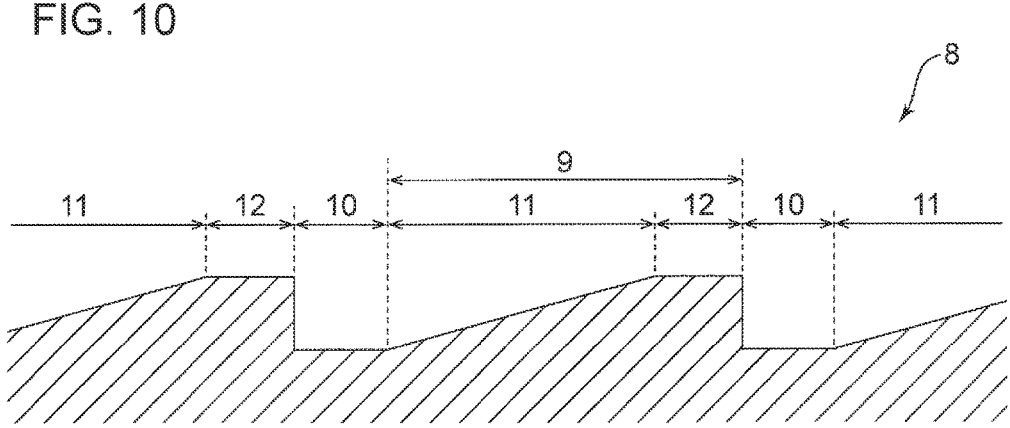
FIG. 10 is a cross-sectional view taken along line I-I in FIG. 9.

With reference to FIGS. 7 to 11, a thrust bearing according to a related art will be described. FIG. 7 is a cross-sectional view of a schematic configuration of a rotary apparatus provided with a thrust bearing according to a related art. FIG. 8 is a cross-sectional view of a part of FIG. 7. FIG. 9 is a planar view of a bearing surface of the thrust bearing in FIG. 7 as seen in an axial direction. FIG. 10 is a cross-sectional view taken along line I-I in FIG. 9. FIG. 11A is a numerical calculation result of a pressure distribution of lubricant oil on a bearing surface in FIG. 9. FIG. 11B is a numerical calculation result of a filling rate of lubricant oil on a bearing surface in FIG. 9. FIG. 11C is a numerical calculation result of a streamline distribution of lubricant oil on a bearing surface in FIG. 9.

A rotary machine 100 is an example of a rotary apparatus provided with a thrust bearing 8 according to a related art, which is, for instance, a supercharger or a turbocharger. The rotary machine 100 includes a rotor 2 inside a housing 1. The rotor 2 includes a rotor shaft (rotational shaft) 3, a compressor impeller 4 disposed on an end of the rotor shaft 3, a thrust collar 5 fixed to a substantially center part of the rotor shaft 3, and a turbine 6 disposed on the other end of the rotor shaft 3.

The rotor 2 is supported by a pair of journal bearings 7 disposed on either side of the thrust collar 5 at more than one location, and a thrust load is supported by a thrust bearing 8 disposed so as to face both bearing surfaces of the thrust collar 5. In the rotary machine 100 having the above configuration, the pair of journal bearings 7 only supports the weight of the rotor 2 (if the rotary machine 100 is a vertical type, even the weight is not applied and the journal bearings 7 just function to determine position). In contrast, the thrust bearing 8 receives a load of a total force generated by an aerodynamic pressure applied to blades of the compressor impeller 4 and the turbine 6.

The thrust bearing 8 is a tapered-land type thrust bearing, and provided with a plurality (ten in the example of FIG. 9) bearing pads 9, which are fixed segments, arranged along the circumferential direction on a bearing surface (slide surface) 8a facing the thrust collar 5. On each of the bearing pads 9, an oil-feed port 10, a tapered portion 11, and a land portion 12 are formed continuously along the circumferential direction.

The reference number 13 corresponds to a shroud section surrounding an inner periphery portion 11a and an outer periphery portion 11b of the tapered portion 11.

The oil-feed port 10 is formed so as to extend along a radial direction, at the most downstream side of each bearing pad 9 with respect to the rotational direction. An oil-feed hole 15 communicating with an oil-feed passage 16 is disposed in the vicinity of the inner side of the oil-feed port 10 with respect to the radial direction. Lubricant oil is supplied to the oil-feed passage 16 from an oil-feed pump 18 via a discharge line 17 (see FIG. 7). The lubricant oil discharged from the thrust bearing 8 is stored in an oil pan 20 disposed below a housing 1. The oil pan 20 is connected to the oil-feed pump 18 via an intake line 19, forming a circulation path with the discharge line 17.

The lubricant oil supplied from the oil-feed port 10 is drawn into clearance between the thrust bearing 8 and the thrust collar 5, in response to relative rotation of the thrust bearing 8 and the thrust collar 5. The clearance has a wedge shape in a region corresponding to the tapered portion 11, and a parallel shape continuous to the wedge shape in a region corresponding to the land portion 12. In such clearance, a hydrodynamic dynamic pressure is generated, and a load applied to the thrust bearing 8 is supported.

For the thrust bearing 8 having the above configuration, the present inventors performed a numerical analysis on the lubrication performance upon the bearing surface (slide surface) 8a by using the computational fluid dynamics (CFD). As a result, it was found that there is a region where the lubrication performance is more or less insufficient on the bearing surface (slide surface) 8a. This region will hereinafter be called "oil shortage region 30", if needed.

Figure 11A:
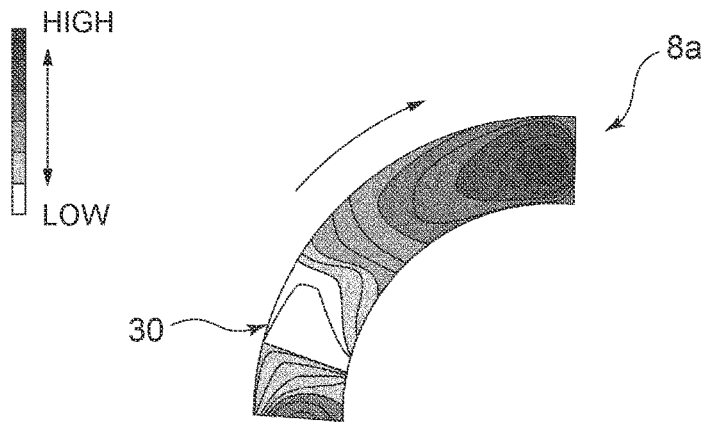
FIG. 11A is a simulation result of a pressure distribution of lubricant oil on a bearing surface in FIG. 9.

With reference to FIG. 11A, within the bearing surface 8a, the pressure of the lubricant oil is lower at the upstream side of each bearing pad 9 with respect to the rotational direction, than at the downstream side with respect to the rotational direction. Such a pressure decrease in the lubricant oil is especially remarkable at the outer side with respect to the radial direction.

Figure 11B:
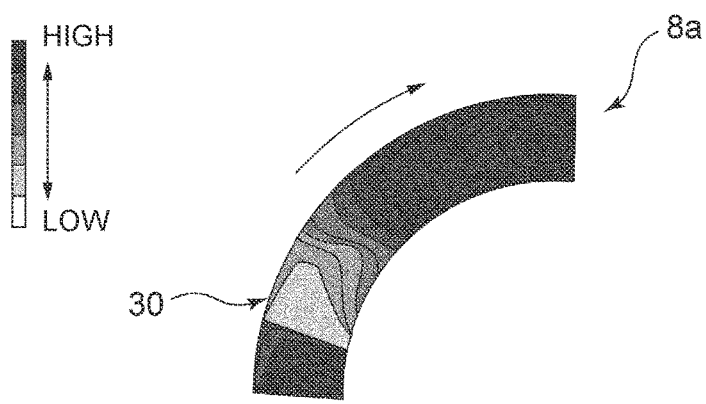
FIG. 11B is a simulation result of a filling rate of lubricant oil on a bearing surface in FIG. 9.

With reference to FIG. 11B, within the bearing surface 8a, the filling rate of the lubricant oil (=a ratio of the amount of lubricant oil to the unit volume of clearance) is lower at the upstream side of each bearing pad 9, with respect to the rotational direction, than at the downstream side with respect to the rotational direction. Such a decrease in the filling rate of the lubricant oil is especially remarkable at the outer side with respect to the radial direction.

Figure 11C:
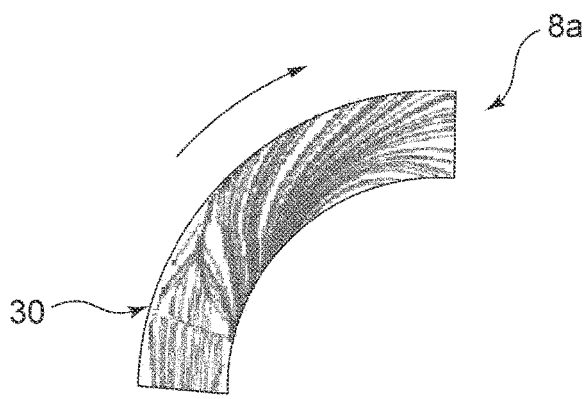
FIG. 11C is a simulation result of a streamline distribution of lubricant oil on a bearing surface in FIG. 9.

With reference to FIG. 11C, within the bearing surface 8a, the streamline density of the lubricant oil is lower at the upstream side of each bearing pad 9 with respect to the rotational direction, than at the downstream side with respect to the rotational direction. Such a decrease in the streamline density of the lubricant oil is especially remarkable at the outer side with respect to the radial direction.

Accordingly, with reference to FIGS. 11A to 11C, the thrust bearing 8 according to the related art has the oil-shortage region 30 on the upstream side of each bearing pad 9 with respect to the rotational direction within the bearing surface 8a, especially on the outer side in the radial direction. Such an oil-shortage region 30 may cause bearing loss of the thrust bearing 8 and thus raise a problem. Such a problem will be solved by embodiments of the present invention described below.

Embodiment

Subsequently, a thrust bearing 8 according to some embodiments of the present invention will be described. In the following description, the same features as those in the above described related art are associated with the same reference numerals, and not described again unless otherwise required.

Figure 1:
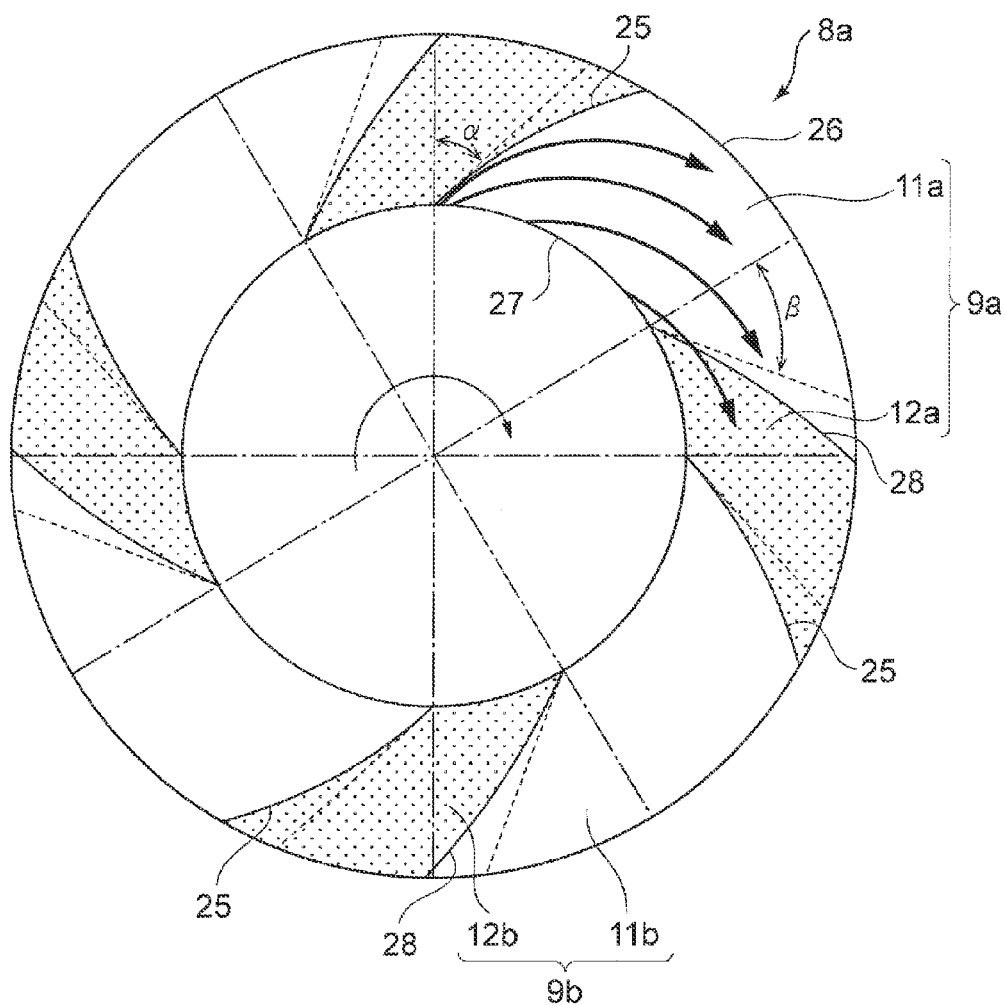
FIG. 1 is a schematic diagram of a bearing surface of a thrust bearing according to an embodiment of the present invention.
Figure 2:
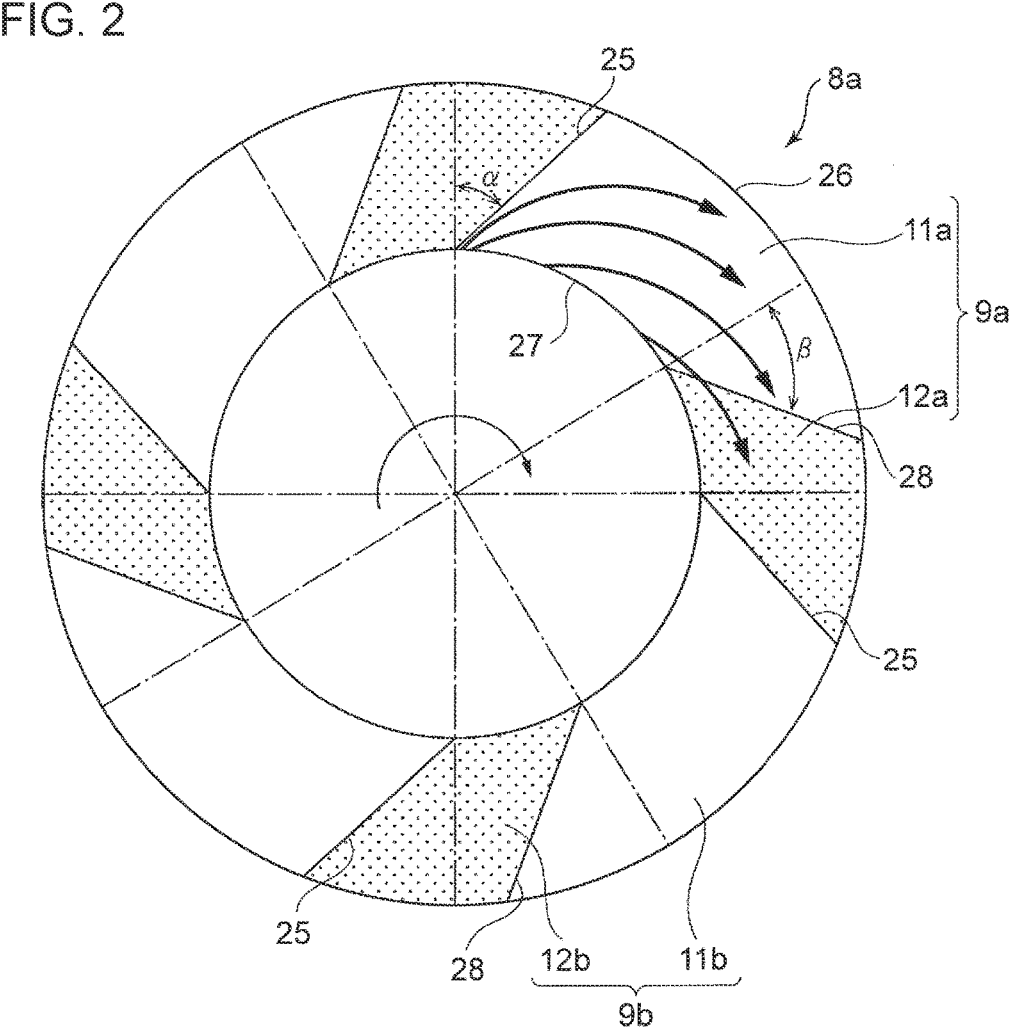
FIG. 2 is a modified example of FIG. 1.
Figure 3:
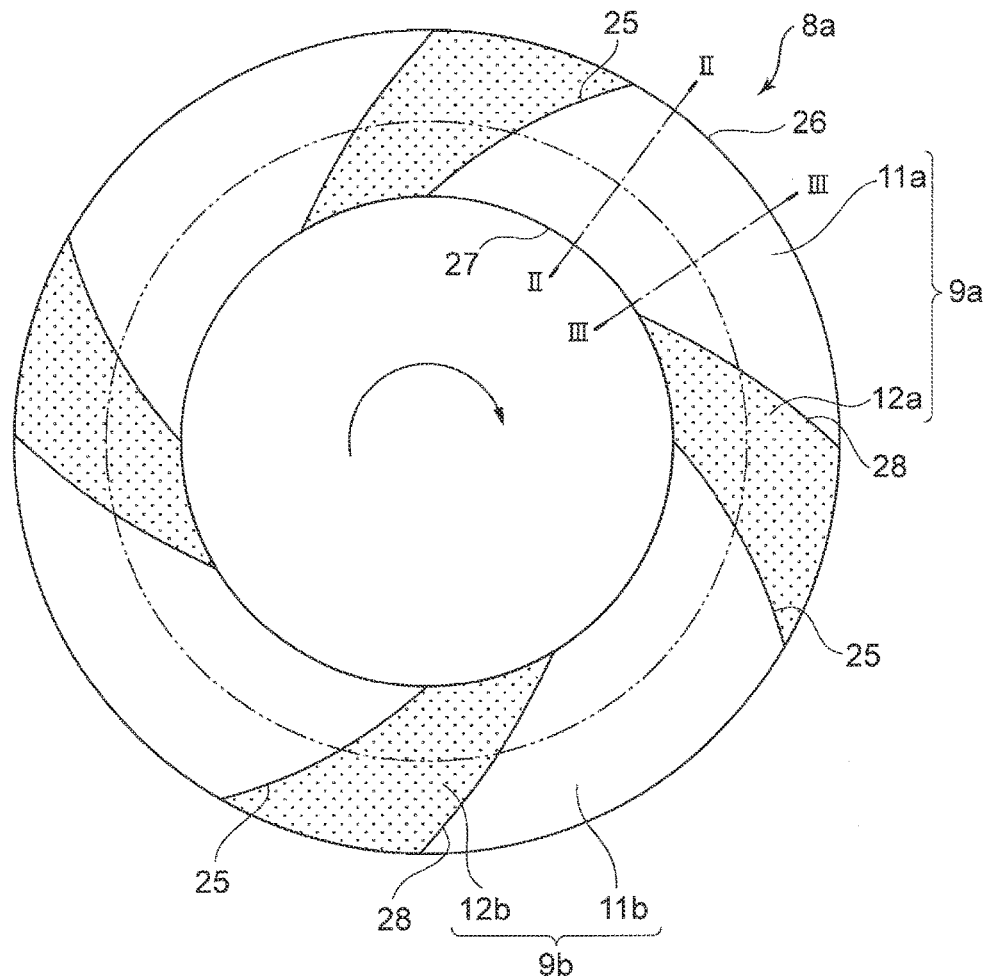
FIG. 3 is a modified example of FIG. 1.
Figure 4:
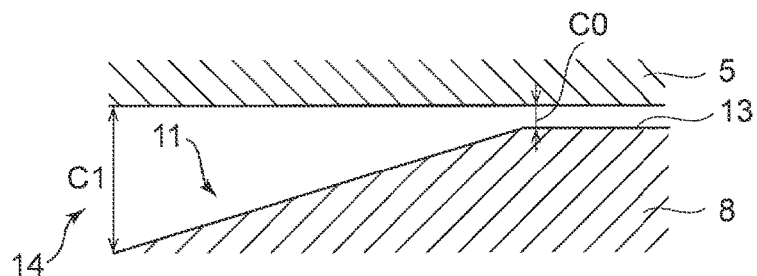
FIG. 4 is a cross-sectional view taken along line II-II in FIG. 3.
Figure 5:
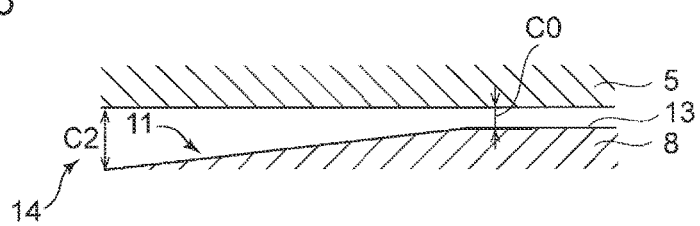
FIG. 5 is a cross-sectional view taken along line III-III in FIG. 3.
Figure 6:
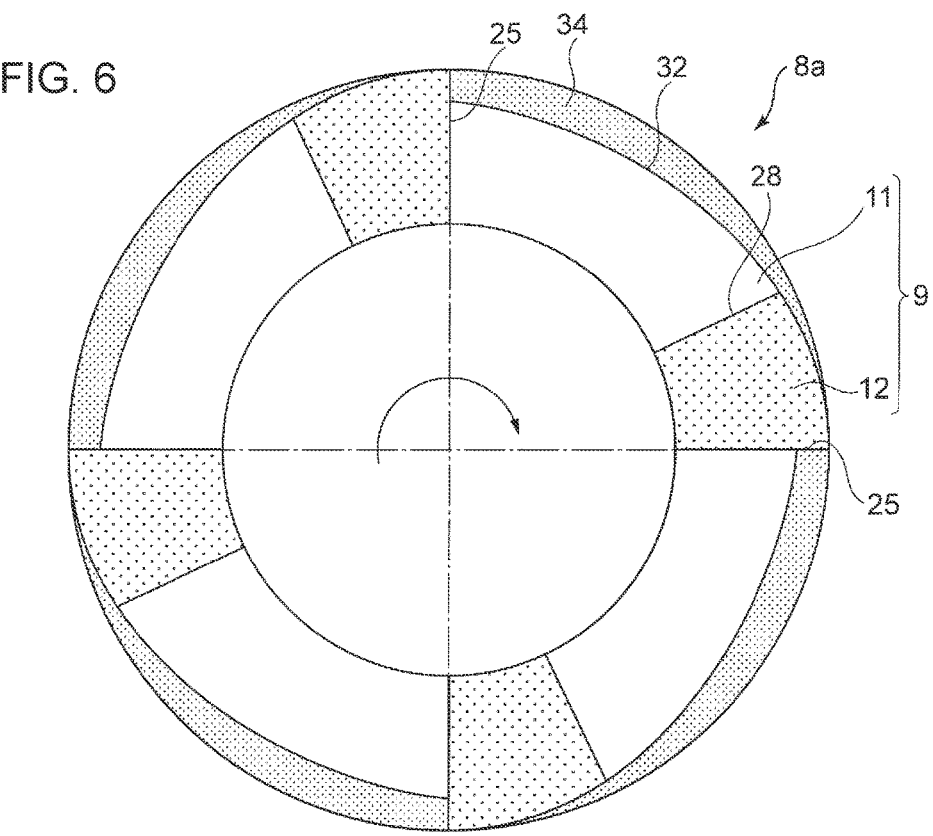
FIG. 6 is a schematic diagram of a bearing surface of a thrust bearing according to an embodiment of the present invention.

FIG. 1 is a schematic diagram of the bearing surface 8a of the thrust bearing 8 according to an embodiment of the present invention. FIG. 2 is a modified example of FIG. 1. FIG. 3 is a modified example of FIG. 1. FIG. 4 is a cross-sectional view taken along line II-II in FIG. 3. FIG. 5 is a cross-sectional view taken along line in FIG. 3. FIG. 6 is a schematic diagram of the bearing surface 8a of the thrust bearing 8 according to an embodiment of the present invention.

The present embodiment is different from the above described related art in that the tapered portion 11 and the land portion 12 disposed on the bearing surface of the thrust bearing 8 have different configurations, and the rest of the configuration is similar to that of the above related art unless otherwise stated.

A plurality of (four in the example of FIG. 1) bearing pads 9, each including a pair of a tapered portion 11 and a land portion 12, is disposed on the bearing surface 8a of the thrust bearing 8 along the rotational direction (the land portion 12 is shaded to help understanding of the configuration in the drawings). The tapered portion 11 is formed so that clearance 14 between the thrust collar 5 and the thrust bearing 8 reduces toward the downstream side with respect to the rotational direction. The land portion 12 is formed so that the clearance 14 between the thrust collar 5 and the thrust bearing 8 is substantially constant, and is formed continuously from the downstream side of the tapered portion 11 with respect to the rotational direction.

While the tapered portion 11 has a constant inclination angle along the rotational direction (i.e., the tapered portion 11 has an inclined cross-section that extends linearly along the rotational direction), the shape of the tapered portion 11 is not limited to this (for example, the tapered portion 11 may have an inclined cross-section being a convex or concave curve along the rotational direction).

Each of the bearing pads 9 is formed so that a periphery portion on the outer side in the radial direction gets closer to the inner side in the radial direction toward the upstream side with respect to the rotational direction. Here, the description will focus on two adjacent bearing pads 9 in FIG. 1 (for the sake of convenience, the bearing pad on the upstream side will be referred to as the first bearing pad 9a, and the bearing pad on the downstream side as the second bearing pad 9b). The periphery portion of each bearing pad 9 on the outer side in the radial direction includes an outer periphery 26 and an inner periphery 27 of the bearing pad 9, as well as a boundary line 25 between the land portion 11a of the first bearing pad 9a and the tapered portion 11b of the second bearing pad 9b. In the present embodiment, the boundary line 25 of the periphery portion on the outer side with respect to the radial direction is formed so as to get closer to the inner side with respect to the radial direction toward the upstream side with respect to the rotational direction. In other words, the boundary line 25 is formed so as to incline from the radial direction toward the downstream side in the rotational direction.

Furthermore, the boundary line 25 forms an inclination angle α with the radial direction at the innermost side in the radial direction, and is formed so that the inclination angle α increases toward the outer side in the radial direction. In other words, the boundary line 25 has a curved shape. As depicted in FIG. 11C, the streamlines of lubricant oil on the bearing surface 8a have a curved shape. In FIG. 1, the shape of the boundary line 25 is formed so as to correspond to the streamlines of lubricant oil. Accordingly, the oil-shortage region 30 depicted in FIG. 11 is effectively reduced (on the other hand, the land portion 12 with sufficient lubricant oil substantially increases), which makes it possible to reduce bearing loss of the thrust bearing 8 effectively.

Alternatively, as depicted in FIG. 2, the boundary line 25 may be formed into a linear shape. In this case, the boundary line 25 has a shape different from the streamline shape (see FIG. 11C) of the lubricant oil on the bearing surface 8a, and more than a little of the oil-shortage region 30 still exists as compared to the case of FIG. 1, but the bearing structure is more simple and thus advantageous in terms of cost.

As depicted in FIGS. 1 and 2, a boundary line 28 between the tapered portion 11 and the land portion 12 on each bearing pad 9 may have an inclination angle β with respect to the radial direction. The inclination angle β may be the same as the above described inclination angle α, or different.

Next, with reference to FIGS. 3 to 5, a thrust bearing 8 according to another embodiment will be described. This embodiment is different in that clearance 14 is formed at the tapered portion 11 so as to decrease toward the outer side with respect to the radial direction, in addition to the boundary line 25 being inclined from the radial direction similarly to FIG. 1.

As depicted in FIG. 4, on the relatively upstream side of the tapered portion 11 with respect to the rotational direction, the clearance 14 is C1 at the innermost side in the radial direction, and the clearance 14 converges to the clearance C0, which is equivalent to the land portion 12, toward the outer side with respect to the radial direction, thus being formed continuous to the shroud section 13. Furthermore, as depicted in FIG. 5, on the relatively downstream side of the tapered portion 11 with respect to the rotational direction, the clearance 14 is C2 (<C1) at the innermost side in the radial direction, and the clearance 14 converges to the clearance C0, which is equivalent to the land portion 12, toward the outer side with respect to the radial direction, thus being formed continuous to the shroud section 13.

As described above, the tapered portion 11 is formed so that inclination in the radial direction becomes less steep toward the downstream side in the rotational direction.

The lubricant oil on the bearing surface 8a flows toward the outer side in the radial direction, in response to a centrifugal force generated by rotation of the rotor shaft 3, and is discharged to the shroud section 13. In the present embodiment, the clearance 14 is inclined along the radial direction, and thereby it is possible to retard drainage of the lubricant oil out to the outer side in the radial direction. In other words, it is possible to substantially increase the amount of lubricant oil that remains on the bearing surface 8a. Accordingly, the bearing loss is reduced even more effectively.

The clearance 14 is formed continuous to the shroud section 13 having the clearance 14 equivalent to the land portion 12 at the outermost side of the tapered portion 11 with respect to the radial direction. Accordingly, it is possible to discharge lubricant oil smoothly to the shroud section 13 while retaining the lubricant oil on the bearing surface 8a, thus preventing formation of local retention of oil in the vicinity of the boundary to the shroud section 13.

While the tapered portion 11 is inclined linearly along the radial direction in FIGS. 3 to 5, the inclined surface along the radial direction may have a curved shape, or even a convex or concave shape. With this configuration, it is possible to retain oil to be discharged outward in the radial direction by a centrifugal force on the bearing surface effectively.

Next, with reference to FIG. 6, a thrust bearing 8 according to yet another embodiment will be described. Also in this thrust bearing 8, each of the bearing pads 9 is formed so that a periphery portion on the outer side with respect to the radial direction gets closer to the inner side in the radial direction toward the upstream side with respect to the rotational direction. Especially in the present embodiment, a periphery portion 32 of the bearing pad 9 on the outer side with respect to the radial direction (i.e., a rim portion, on the outer side with respect to the radial direction, of a region sandwiched by the boundary lines 25 and 28) is formed so as to get closer to the inner side in the radial direction toward the upstream side with respect to the rotational direction. In other words, each of the bearing pads 9 is formed so that the length in the radial direction decreases toward the upstream side with respect to the rotational direction. Accordingly, the oil-shortage region 30 is reduced as much as a region 34 on the outer side of the periphery portion 32 is reduced, as compared to a case where the length of the bearing pad 9 in the radial direction is constant. As a result, the bearing loss is reduced, and it is possible to provide a thrust bearing 8 with a high efficiency.

The region 34 is configured to have the same height as the land portion 12.

In the example of FIG. 6, the periphery portion 32 extending over the entire bearing pad 9 including the tapered portion 11 and the land portion 12 is formed to get closer to the inner side in the radial direction toward the upstream side with respect to the rotational direction. However, only a part the periphery portion 32 corresponding to the tapered portion 11 may be formed to get closer to the inner side in the radial direction toward the upstream side with respect to the rotational direction, while another part of the periphery portion 32 corresponding to the land portion 12 is formed to have a constant length in the radial direction.

While the boundary lines 25 and 28 have a linear shape along the radial direction in FIG. 6, the boundary lines 25 and 28 may have inclination angles α and β, respectively, with respect to the radial direction, as depicted in FIGS. 1 and 2. In this case, the boundary lines 25 and 28 may be curved as depicted in FIG. 1, or be linear as depicted in FIG. 2. Furthermore, as in the embodiment of FIGS. 3 and 5, the tapered portion 11 may be formed so that the clearance 14 reduces toward the outer side with respect to the radial direction.

INDUSTRIAL APPLICABILITY

The present disclosure can be suitably applied to a supercharger provided with a tapered-land type thrust bearing and a rotary machine including the thrust bearing.

DESCRIPTION OF REFERENCE NUMERAL

1 Housing
2 Rotor
3 Rotor shaft
4 Compressor impeller
5 Thrust collar
6 Turbine
7 Journal bearing
8 Thrust bearing
8a Bearing surface
9 Bearing pad
10 Oil-feed port
11 Tapered portion
12 Land portion
13 Shroud portion
14 Clearance
15 Oil-feed hole
16 Oil-feed passage
17 Discharge line
18 Oil-feed pump
20 Oil pan
19 Intake line
25 Boundary line
26 Outer periphery
27 Inner periphery
28 Boundary line
30 Oil-shortage region
100 Rotary machine

The invention claimed is:

1. A thrust bearing, comprising:
a thrust collar fixed to a rotational shaft; and
at least one bearing pad disposed along a circumferential direction on a bearing surface facing the thrust collar, the at least one bearing pad having a tapered portion formed so that clearance between the at least one bearing pad and the thrust collar decreases toward a downstream side with respect to a rotational direction, and a land portion formed continuously from the tapered portion toward the downstream side with respect to the rotational direction so that a clearance between the land portion and the thrust collar is constant,
wherein the at least one bearing pad is formed so that a periphery portion on an outer side with respect to a radial direction gets closer to an inner side with respect to the radial direction toward an upstream side with respect to the rotational direction.

2. The thrust bearing according to claim 1,
wherein the at least one bearing pad comprises a first bearing pad, and a second bearing pad disposed adjacently to the first bearing pad on a downstream side of the first bearing pad with respect to the rotational direction, and
wherein a boundary line between the land portion of the first bearing pad and the tapered portion of the second bearing pad is formed so as to incline from the radial direction toward the downstream side with respect to the rotational direction.

3. The thrust bearing according to claim 2,
wherein the boundary line has a curved shape so that an inclination angle formed with the radial direction increases toward the downstream side with respect to the rotational direction.

4. The thrust bearing according to claim 2,
wherein the boundary line has a linear shape.

5. The thrust bearing according to claim 2,
wherein the tapered portion is formed so that the clearance decreases toward the outer side with respect to the radial direction.

6. The thrust bearing according to claim 5,
wherein the tapered portion is formed so that the clearance on an outermost side with respect to the radial direction is equal to the clearance at the land portion.

7. The thrust bearing according to claim 1,
wherein the at least one bearing pad is formed so that a length of the at least one bearing pad in the radial direction decreases toward the upstream side with respect to the rotational direction.

8. A rotary machine, comprising the thrust bearing according to claim 1.

9. The thrust bearing according to claim 1,
wherein the periphery portion extends at least into an outer periphery of the land portion at the downstream side of the tapered portion with respect to the rotational direction.

* * * * *